Dec. 11, 1928.

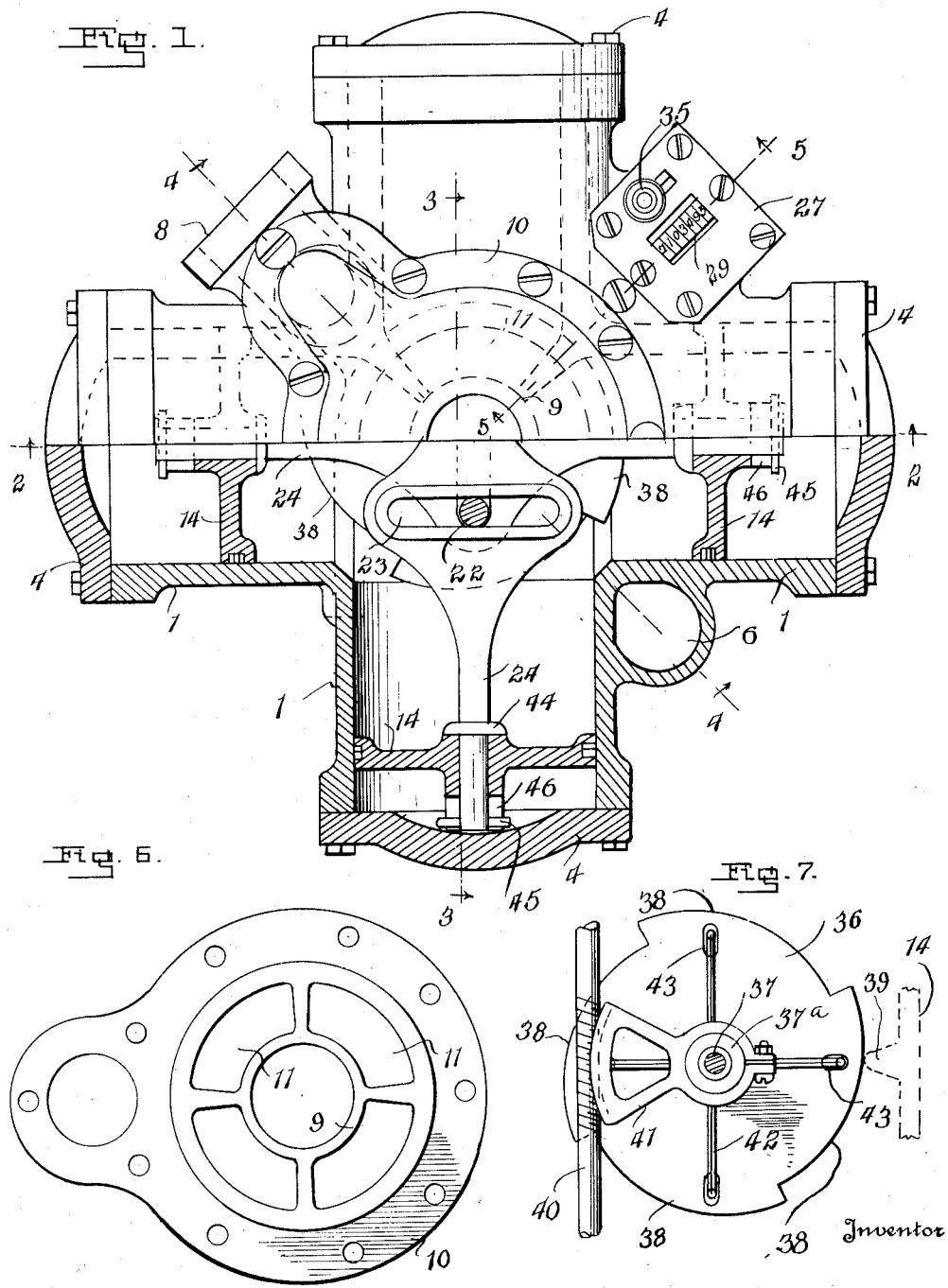

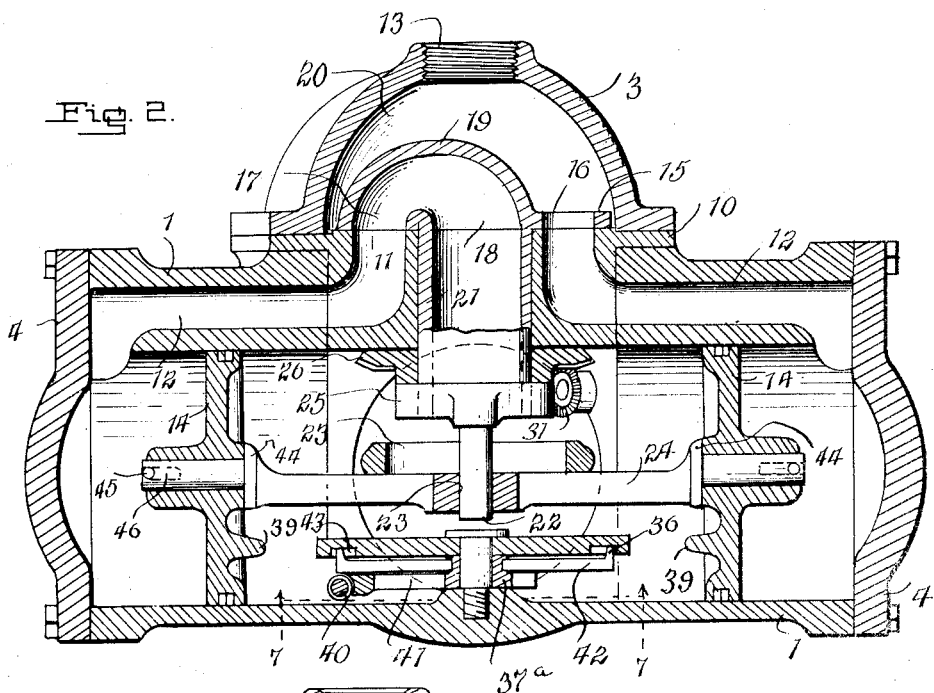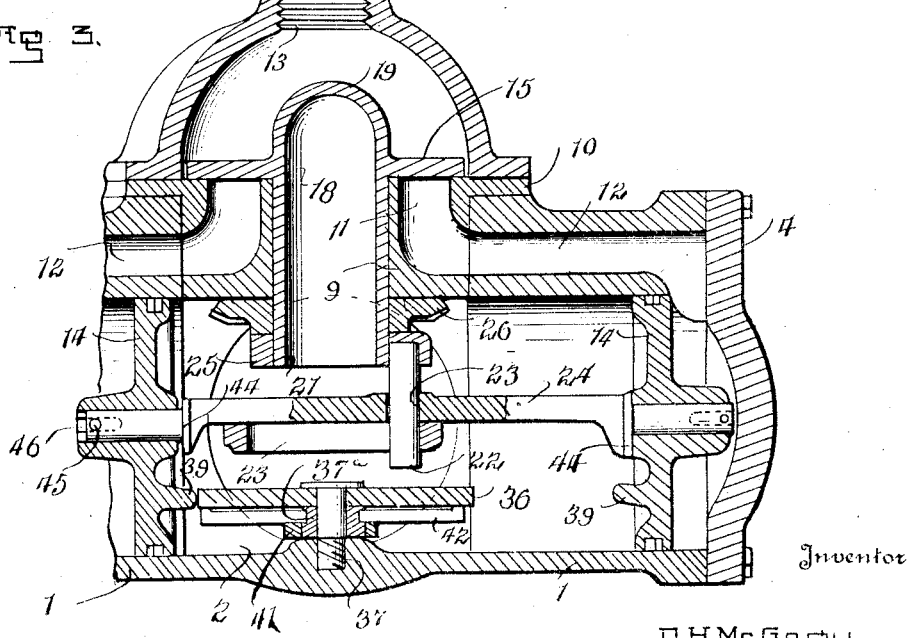

D. H. McGOGY 1,694,747

LIQUID METER

Filed April 26, 1927      3 Sheets-Sheet 3

Inventor

D. H. McGogy

By Lacey & Lacey, Attorneys

Patented Dec. 11, 1928.

1,694,747

UNITED STATES PATENT OFFICE.

DONALD H. McGOGY, OF McMINNVILLE, OREGON, ASSIGNOR TO McGOGY PUMP CO., INC., OF McMINNVILLE, OREGON, A CORPORATION OF OREGON.

LIQUID METER.

Application filed April 26, 1927. Serial No. 186,717.

This invention relates to meters for measuring and recording the amount of liquid flowing through a pipe or other conduit and provides an operating mechanism including oppositely disposed cylinders, connected pistons operating therein, a rotary valve for controlling the inflow and the outflow of the liquid and actuated by the pistons, and a registering mechanism for indicating and recording the number of units of measure of fluid flowing through the meter.

The invention provides a meter of the character aforesaid which is positive and certain in action and which includes a few number of parts and means whereby the mechanism may be adjusted to insure accuracy in recording.

While the drawings illustrate a preferred embodiment of the invention, it is to be understood that in adapting the means to meet specific needs and requirements the design may be varied and such other changes in the minor details of construction may be resorted to within the scope of the invention as claimed, without departing from the spirit thereof.

For a full understanding of the invention and the merits thereof, reference is to be had to the following description and the drawings hereto attached, in which, Figure 1 is a top plan view of a meter embodying the invention, one half being in section.

Figure 2 is a vertical section on the line 2—2 of Figure 1, looking in the direction of the arrows.

Figure 3 is a detail sectional view on the line 3—3 of Figure 1.

Figure 6 is a top plan view of the valve seat.

Figure 7 is a detail sectional view on the line 7—7 of Figure 2, of the means for regulating the stroke of the pistons.

Corresponding and like parts are referred to in the following description and designated in the several views of the drawings by like reference characters.

Figure 4:
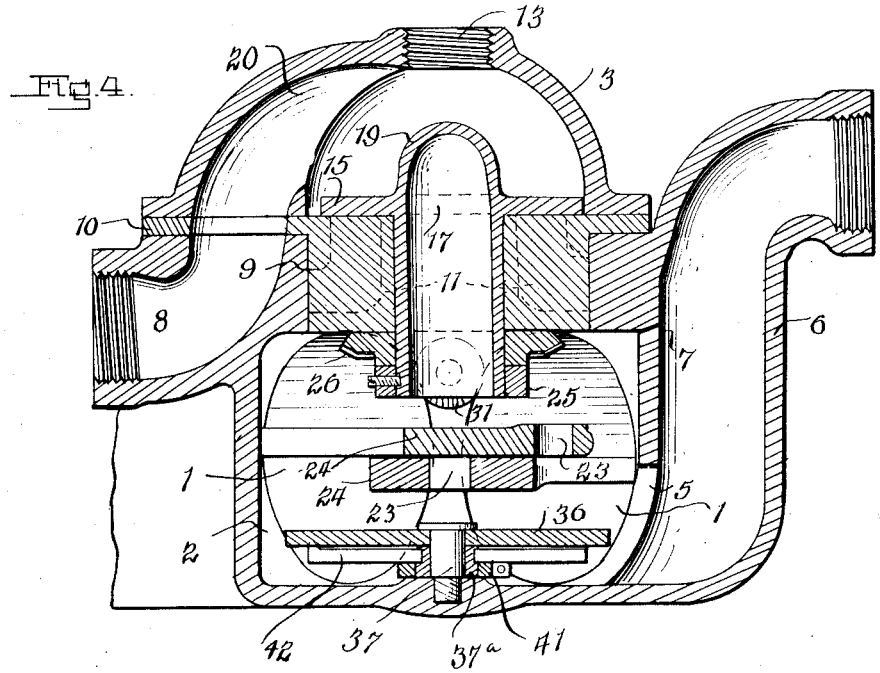
Figure 4 is a sectional view on the line 4—4 of Figure 1, looking in the direction of the arrows.
Figure 5:
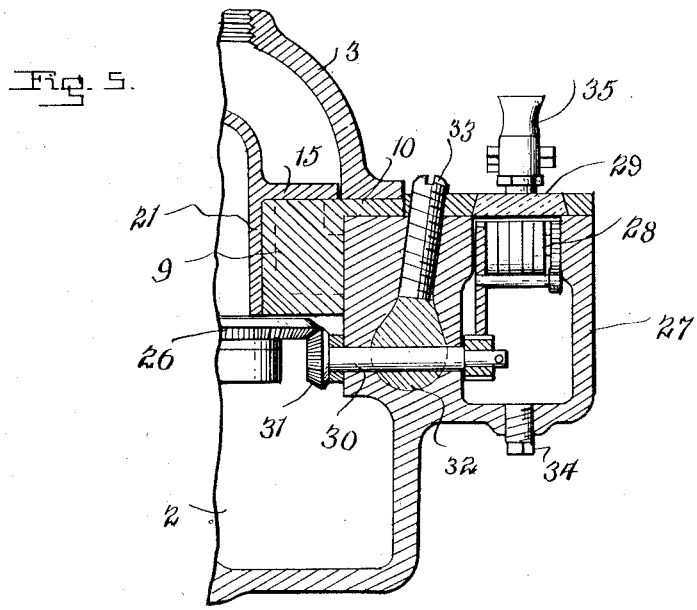
Figure 5 is a fragmentary sectional view on the line 5—5 of Figure 1, looking in the direction of the arrows.

The body of the meter preferably consists of a casting embodying a plurality of oppositely disposed cylinders 1 radiating from a centrally disposed chamber 2 which is closed at its bottom and open at the top to which is fitted a dome shaped cover 3. The cylinders 1 are in communication at their inner ends with the chamber 2 and their outer ends are closed by caps 4 which are bolted, or otherwise secured thereto. The chamber 2 is provided in a side with an outlet 5 with which a discharge 6 connects so as to carry off the liquid flowing through the meter. The discharge 6 preferably forms a part of the casting in which an outflow passage constituting the discharge 6 is formed. A vent opening 7 establishes communication between the top of the chamber 2 and the passage 6, thereby preventing any gas from accumulating in the upper portion of the chamber and interfering with the accuracy of the meter. An inlet 8 likewise forms a part of the casting and consists of a passage formed therein. The inlet 8 and the outlet 6 are located at opposite points, as indicated most clearly in Figures 1 and 4 of the drawings. A valve seat is fitted to the top portion of the body and comprises a central portion 9 and a flange 10, the latter overlapping the top of the casting to which it is bolted, and the central portion 9 entering the opening in the top of the casting leading from the chamber 2. The central portion 9 of the valve seat has openings 11 formed therein which constitute ports for the ingress and the egress of the liquid in its flow through the meter. The inner or lower ends of the ports 11 curve laterally and communicate with the inner ends of passages 12 formed in the body of the casting and which passages connect at their outer ends with the respective cylinders 1. The flange portion 10 of the valve seat is clamped between the cover 3 and the top of the casting forming the body of the meter and projects laterally to extend over the inlet, as shown most clearly in Figures 1 and 4. The cover 3 is provided at its top with an opening 13 which may be utilized as an inlet when the location of the meter will not admit of the lateral inlet 8 being conveniently used. It is observed that when the supply pipe, not shown, is connected to one of the inlets 8 or 13, the other inlet is closed by means of a plug, not shown.

In the present instance the meter is shown as comprising four cylinders. The pistons 14 of opposite cylinders are connected for simultaneous movement in a manner so that when one of the pistons moves inwardly in its cylinder, the companion piston connected thereto moves outwardly in its cylinder. In consequence of this arrangement the liquid entering one cylinder effects movement of the piston in the diametrically opposite cylinder to expel the liquid therefrom, which passes into the chamber 2, thence outwardly through the outlet 5 and discharge 6. The flow of the liquid is controlled by means of a valve mechanism.

The valve 15 is of circular outline and is mounted upon the seat for rotary movement and is provided with an inlet port 16 and outlet ports 17 and 18, the latter being centrally disposed and the ports 16 and 17 being located upon opposite sides of the port 18 and at diametrically opposite points. A housing 19 connects the ports 17 and 18, whereby to isolate, or separate said ports from the inlet port 16. The ports 16 and 17 conform to the ports 11 and successively register with the ports 11 in the rotation of the valve. A space 20 is formed between the cover 3 and the valve to receive the inflowing liquid which passes from the space 20 through registering ports 16 and 11 into the outer end of a cylinder to effect positive movement of the piston 14 therein. In the operation of the meter the valve is rotated, thereby causing the inlet port 16 to successively register with the ports 11, and the port 17 to successively register with the ports 11 diametrically opposite the ports with which the inlet port 16 of the valve is in registration. The ports 16 and 17 have a radian angularity slightly less than the radian angularity of the ports 11 to allow a slight lap and lead. It will thus be understood that the fluid is successively supplied to the cylinders at one side of the meter and successively exhausted from the cylinders at the opposite side of the meter, thus the inflow and the outflow is constant.

A tubular extension 21 projects from the valve in line with the central opening 18 and is snugly fitted within the central opening of the valve seat. The opening of the tubular extension 21 is in communication at its upper end with the passage enclosed by the housing 19 and connects at its lower end with the chamber 2. It will thus be understood that the discharge from the cylinders after passing through the housing 19 and the tubular extension 21 enters the chamber 2 and passes therefrom through the opening 5 and outlet 6. Rotation of the valve is effected by a pin 22 depending from the tubular extension 21 at a side thereof and entering slots 23 formed in the rods 24 connecting the pistons 14. The connecting rods 24 have their middle portions widened and these widened portions overlap and cross and the slots 23 are formed therein. The slots 23 cross and change their relation during the movement of the pistons which obtain a smooth harmonic motion due to the fixed circular path of the pin 22 which is attached to the rotary valve 15. The pin 22 may be connected to the tubular extension 21 of the rotary valve in any determinate way, and as shown, a collar 25 is fast to the lower end of the tubular extension 21 and carries the pin 22. A bevel gear 26 is also mounted upon the lower end of the tubular extension 21 and is fast thereto so as to rotate therewith.

A chambered extension 27 is formed upon a side of the casting and contains the registering mechanism 28 which may be of any approved construction commonly employed in meters of various types. The chamber formed in the extension 27 is adapted to contain oil, which serves to lubricate the registering mechanism and to preclude entrance of the liquid therein from the chamber 2. The cap plate closing the top of the chambered extension 27 is provided with an observation opening in which is fitted a lens 29 which may be formed to magnify the indications of the registering mechanism. The operating shaft 30, by means of which movement is transmitted to the registering mechanism, is mounted in a portion of the casting separating the chambered parts 2 and 27. A bevel gear 31 fast to the inner end of the shaft 30 is in mesh with the bevel gear 26 and receives movement therefrom. The part of the casting in which the shaft 30 is mounted is chambered to receive a soft packing 32 which is adapted to be compressed by means of a screw 33 threaded into the casting and having its inner end in contact with the compressible packing 32 whereby a tight joint may be maintained with the shaft 30 to prevent any large exchange of liquids between chambers 2 and 27. The oil from the chambered extension 27 may be drained off therefrom through an opening which is normally closed by means of a plug 34. Clean oil is adapted to be supplied to the chamber of the extension 27 by means of a cup cock 35 fitted to the cap plate which is bolted or otherwise secured to the top of the extension 27.

The throw of the pistons may be regulated by means of a plate 36 which is disposed in the lower portion of the chamber 2 and mounted to be adjusted about a pivot 37. The plate 36 is provided with cam portions 38, positioned to engage projections 39 formed upon the inner faces of the pistons 14. The plate 36 is adapted to be adjusted by hand and regulated automatically by the temperature of the liquid flowing through the meter. To admit of adjustment of the plate 36 by hand a worm shaft 40 is journaled in the body of the meter and meshes with a worm segment 41 clamped to a collar 37$^a$ loose on the pivot 37. Bi-metallic thermostatic strips 42 have their inner ends fast to the collar 37$^a$ and their outer ends engaging elongated openings 43 formed in the plate 36. Thus, it will be seen that the manual and thermostatic adjustments are entrain or series. Movement of the outer ends of the thermostatic elements 42 results in a corresponding movement of the plate 36, thereby positioning the cams 38 to be engaged by the projections 39, whereby to regulate the throw of the pistons.

It should be stated that the pistons 14 have a limited sliding movement on the outer shouldered ends of the rods 24 between the shoulders 44 and pins 45, the latter engaging slots 46 in the outer ends of the hubs or bosses of the pistons. The hubs or bosses result in long bearings which prevent any tendency of the pistons to bind in the cylinders due to the stops 39 being off center. It is observed that the piston which is forcing the liquid through the exhaust ports 11, 17 and 18 has substantially the same pressure exerted on both sides and is moved by the shoulder 44 and being in equilibrium it will always bear against the shoulder 44. When the inwardly traveling piston is reaching the limit of its throw its stop 39 engages a cam portion 38 of the stop 36 and limits its movement, the rod 24 continuing to move a short distance to the limit of its throw. A volumetric adjustment amounting to about 10% of the total displacement of the meter is ample for all ordinary purposes, hence the slippage allowed for the piston 14 on its rod does not need to be more than 10% of the total throw of the crank pin 22, the length of the cylinder, in other words. It will thus be understood how rotation of the cam or stop plate 36 changes the length of throw of the pistons by varying the inner stopping position, the outer stop position always being the same.

The accuracy of the meter is assured as the inlet and the outlet are at the top of the cylinders, thereby preventing the trapping of any air bubbles which would have a tendency to destroy the accuracy of measuring the amount of liquid flowing through the meter.

In the embodiment shown the meter comprises four cylinders 1 which have a 90 degree arrangement, hence, two oppositely disposed cylinders are arranged at a right angle to the other two oppositely alined cylinders. Inasmuch as each two oppositely disposed cylinders 1 have a single piston rod 24 in common it follows that there are but two piston rods which cross each other at a right angle as indicated most clearly in Figure 1. The crossing portions of the piston rods are widened, offset and transversely slotted at 23. The diameter of the pin 22 corresponds with the width of the slots 23 and as the orbital path of the pin is fixed the travel of the piston rods 24 is constant. The inlet port 16 of the valve 15 only momentarily registers with a single port 11. This is true of the outlet port 17. It follows, therefore, that two adjacent pistons 14 are moving inward and the opposite two pistons are moving outward. When the inwardly traveling piston is arrested at the limit of its stroke by the stop elements 38 and 39 the other inwardly traveling piston and its rod continue to move inward and effect a movement of the rod upon which the arrested piston is mounted. Thus there is an independence of movement between the pistons 14 and their rods 24 in the manner stated.

Having thus described the invention, I claim:

1. A meter comprising oppositely and angularly disposed cylinders, pistons therein, crossing rods connecting opposite pistons which have a limited movement thereon and having their intermediate portions widened and transversely slotted, a rotary valve regulating the inflow and outflow of liquid to and from the cylinders, a crank pin carried by the rotary valve and engaging the slots of the piston connecting rods at their points of crossing, manually operable means for regulating the flow through the meter by varying the movement of the pistons on their inward travel, and means actuated by the valve for registering the volume flowing through the meter.

2. A meter of the character described, comprising a central chamber, opposite cylinders radiating from the chamber horizontally and in communication therewith at their inner ends, pistons in the cylinders, rods connecting opposite pistons and having their intermediate portions widened and slotted, a rotary valve for regulating the inflow and outflow of liquid to and from the cylinders, a crank pin carried by the rotary valve and engaging the crossed slots of the piston connecting rods, manually operable means for limiting the movement of the pistons in one direction, automatic means for adjusting the stroke of the pistons to compensate for volumetric changes in the liquid being measured due to its heat content, and means actuated by the valve for registering the volume flowing through the meter.

3. A meter of the character described comprising a chamber having an inlet and an outlet and an intermediate valve seat provided with ports, opposite cylinders radiating from the chamber and in communication therewith at their inner ends, and having passages at one side which connect at their outer end with the upper outer ends of the respective cylinders and at their inner ends with the ports in the valve seat, pistons in the cylinders, rods connecting opposite pistons and having their intermediate portions widened and slotted, a rotary valve resting on the valve seat and having a central opening and two lateral ports, a housing connecting the central opening with one of the lateral ports, a tubular extension projecting from the valve in line with the central opening thereof and in communication with the said chamber, a crank pin projecting from the tubular extension and eccentrically located with respect to the axis of rotation of said tubular extension, which engages the crossed slots of the rods connecting the pistons, manually operable means for adjusting the throw of the pistons, thermostatically controlled means in series with the manually operable means for adjusting the throw of the pistons to compensate for contraction and expansion of the liquid being metered, and means geared to rotary valve extension for registering volume passed through the meter.

4. A meter comprising a body including a chamber and opposite cylinders, pistons in the cylinders, rods loosely connecting opposite pistons to admit of a continued movement of the rods after the inwardly traveling pistons have been arrested, a rotary valve, connecting means between the valve and rods connecting the pistons, a cam plate in the said chamber and having a cam surface on its periphery for each piston, a plurality of bi-metallic thermostatic strips adjacent to the said cam plate and slidably attached thereto at one end, a hub constructed with the cam plate and having the opposite ends of the thermostatic strips fixed thereto, manually operable means without the meter body connected to the said hub for movement thereof, and means actuated by the rotary valve for registering the volume of liquid passed through the meter.

In testimony whereof I affix my signature.

DONALD H. McGOGY. [L. S.]